Jan. 14, 1964 S. I. OLSEN 3,117,618
BUFFING MACHINES FOR AUTOMOBILE TIRES
Filed Nov. 3, 1961 3 Sheets-Sheet 1

INVENTOR.
SIGURD I. OLSEN
BY

INVENTOR.
SIGURD I. OLSEN

United States Patent Office 3,117,618
Patented Jan. 14, 1964

3,117,618
BUFFING MACHINES FOR AUTOMOBILE TIRES
Sigurd Ingemann Olsen, 50–52 Lumbyvej,
Odense, Denmark
Filed Nov. 3, 1961, Ser. No. 149,941
7 Claims. (Cl. 157—13)

The present invention relates to improvements in buffing machines for automobile tires.

More particularly, the invention relates to buffing machines of the type provided with clamping members by means of which the tire to be buffed is fixed on a horizontal shaft in a vertical position in relation to a buffing member attached to a carrier which, by coaction with a template, is movable from one side of the tire across the tread to the other side thereof.

Hitherto known buffing machines of this type are subject to various disadvantages that render them ineffective to the extent required by modern industry in connection with tire buffing machines. Such known tire buffing machines are either relatively complicated in construction or extremely simple. Since in both instances they utilize relatively large buffing wheels or discs, they are somewhat dangerous for the operator and they require considerable power consumption. Furthermore, such buffing wheels or discs are not suitable for exact and careful buffing of the shoulders and sides of modern tires. Another disadvantage of hitherto known tire buffing machines of the type in question is that adjustment of the housing and buffer member in relation to the tire tread and the template requires a plurality of adjustment operations that cannot be effectuated automatically, and which necessitate the employment of a considerable number of templates for the various sizes of tires to be buffed, irrespective of their profiles being more or less alike. Tire buffing machines as hitherto known require considerable floor space. Finally, hitherto known tire buffing machines are not suitable for buffing heavy tires with prominent ribs, such as in tractor tires, because the buffing member is rapidly worn out.

The main object of the present invention is to provide a tire buffing machine by means of which it is possible to automatically buff tires of any size and any profile.

Another object of the invention is to provide means by which it is possible to buff tires along their treads and shoulders and sides in accordance with a predetermined design.

Still another object of the invention is to provide a tire buffing machine in which it is possible to treat a considerable number of variations in tire profiles and tire sizes with a small number of templates.

Yet another object of the invention is to provide means in a tire buffing machine by which it is possible to adjust the buffing member in relation to the tire tread independently of the means for rotating the buffer member across the profile of the tire to be buffed.

An object of the invention is furthermore to provide frictional driving means for rotating the buffer housing upon a vertical stationary pivot, and means for engaging and disengaging said friction driving means.

Another object of the invention is to provide means for automatically adjusting the supporting members for the tire to be buffed, and the means for rotating the tire during the buffing operation.

It is also an object of the invention to provide suction means in connection with adjusting and driving means for the buffer and tire for removing offal from the buffing operation.

A further object of the invention is to provide a cutter member for treating heavy work, and means for protecting the buffer member during employment of the cutter member.

These and other objects of the invention will be evident from the following description of one embodiment of a tire buffing machine according to the invention, taken in conjunction with the accompanying drawings.

Figures 1, 6:
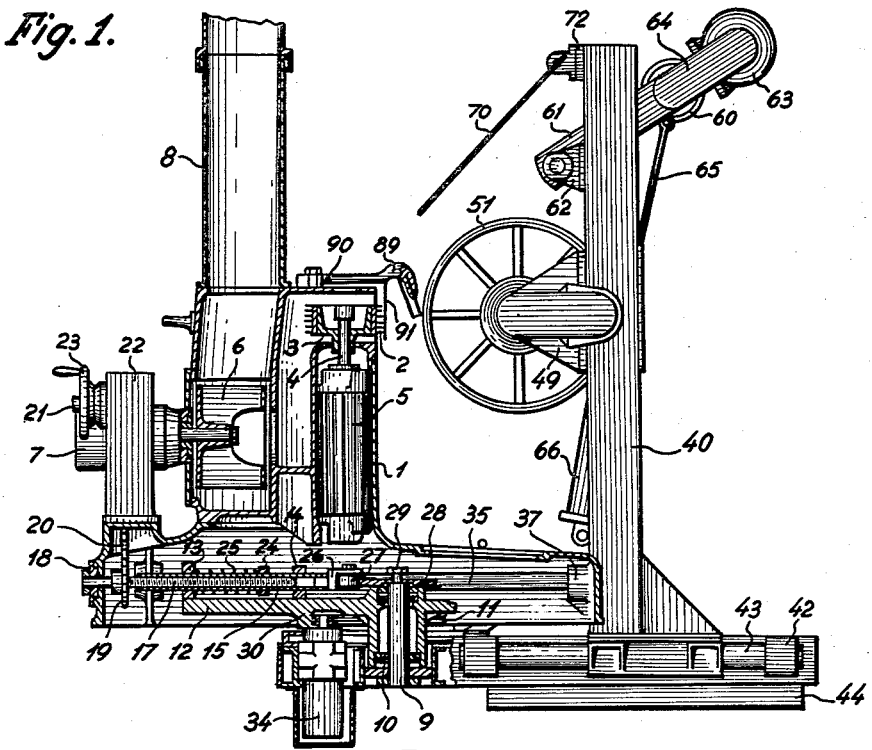
FIG. 1 is a vertical sectional view through the buffing machine.
FIG. 6 shows on an enlarged scale the means for rotating the housing on the vertical pivot.

The buffing machine illustrated in the drawings comprises three main parts, viz. a buffing member housing, means for operating the machine enclosed within the said housing, and a framework for supporting the tire to be buffed.

Referring particularly to FIG. 1, the buffing member housing is indicated by 1 and includes in its upper portion a buffing member 2 which is rotatably journalled in a fixed bearing 3 and connected to the shaft 4 of an electromotor 5. Further, this upper part of the housing 1 contains a suction blower 6 that is operated by means of an electromotor 7 mounted on the outer wall of the housing. This blower is connected to an exhaust pipe 8 for exhausting offal from the buffing operation.

Figure 2:
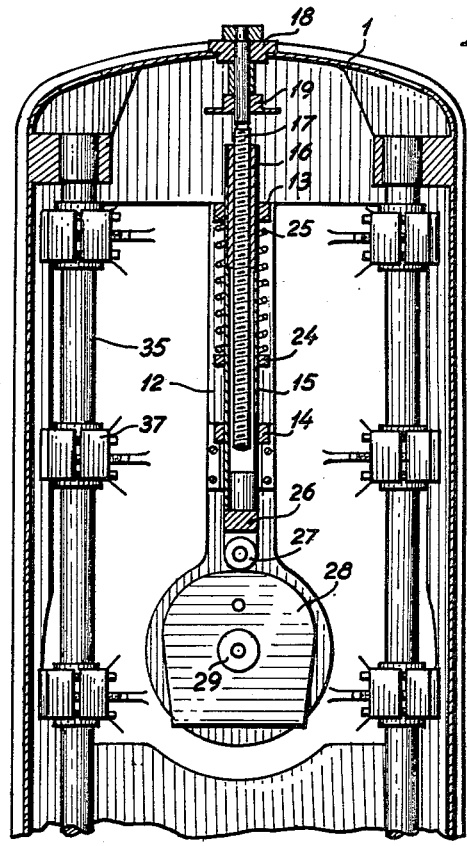
FIG. 2 shows on an increased scale the means for adjusting the buffer housing in relation to the template.

The lower part of the housing 1 contains the operating mechanism for the buffing machine. This mechanism comprises a rigidly mounted vertical pivot 9 upon which a bushing 11 is rotatably journalled by means of ball bearings 10. The bushing 11 is provided on its upper part with a platform 12 that extends radially within the housing. This platform is provided with two spaced and upwardly projecting bearings 13 and 14 for a slidable guide tube 15 which has an internal screw thread 16, see FIG. 2. Within this guide tube 15 there is inserted an externally threaded spindle 17 that is rotatable but not longitudinally displaceable in a bearing 18 in the wall of the housing 1. Between the bearing 18 and the adjacent end of the guide tube 15 there is rigidly attached a sprocket 19 which is connected by chain 20 to another sprocket (not visible in the drawing) mounted on a shaft 21 journalled in a casing 22 atached to the housing 1 above the sprocket 19. The free end of shaft 21 has attached thereto a hand wheel 23. By means of this sprocket and chain device it is possible by hand to rotate the spindle 17 in either direction, thereby longitudinally displacing the guide tube 15 in the one or other direction. Between and spaced from the bearings 13 and 14 the guide tube 15 has a fixed exterior abutment ring 24. Between this abutment ring 24 and the bearing 13 there is inserted a coil spring 25 that encircles the guide tube and tends to press the tube in the direction of the pivot 9. The end of spring-biased guide tube 15 facing the pivot 9 has attached thereto a bearing 26 in which a follower 27 is rotatably mounted so that it abuts a template 28 which is detachably mounted on the upper end of the pivot by means of a finger screw 29.

The platform 12 has a downwardly projecting and substantially semi-annular flange 30 which, as shown in FIG. 6, is centered about the pivot 9 and has in its inner surface a number of longitudinal grooves 31 engaging friction discs 32 attached to the shaft 33 of an electromotor 34, see FIG. 1. By means of this motor 34 and the friction means 31, 32, the bushing 11 and its platform 12 can be revolved on the pivot 9, and since the housing 1 is connected to the spindle 17, it will likewise be revolved on pivot 9. The housing 1 has furthermore attached thereto two guide rods 35, see FIGS. 1 and 2, that slide in bearings 37 rigidly attached to the housing 1.

Figure 3:
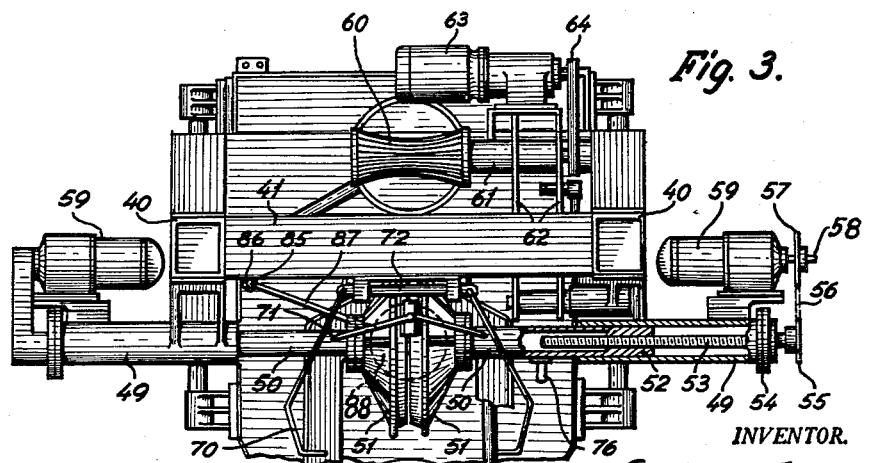
FIG. 3 is a plan elevation of the buffing machine partly in horizontal section.
Figure 4:
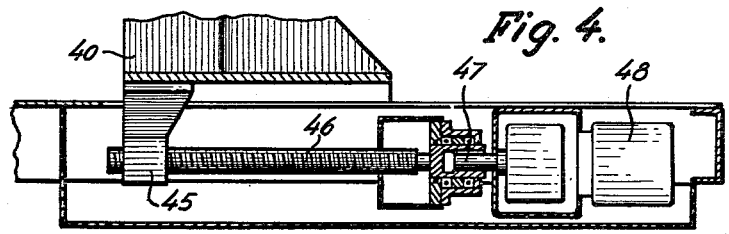
FIG. 4 shows in vertical section a detail of the driving means for the framework.

The framework supporting the tire to be buffed is shown in detail in FIG. 3 and comprises two standards 40 interconnected at their upper ends by means of a head beam 41. The lower ends of the standards 40 are each provided with a bearing 42 for a guide bar 43 rigidly mounted within a base 44, see FIG. 1. Each standard 40 has furthermore an internally threaded guide lug 45, see FIG. 4, for an externally threaded horizontal rod 46 that is connected to the shaft 47 of an electromotor 48 within the said base 43. By means of this motor, the framework 40, 41 may be displaced towards and away from the housing 1.

As shown in FIG. 3, the two standards 40 are each provided with a bearing 49 for a horizontal hollow shaft 50. A wheel rim 51 is freely rotatably attached to each of the ends of shaft 50, which face each other. As shown only in the right hand side of FIG. 3 each shaft 50 has an internal thread 52 in which is threaded a screw spindle 53 that is rotatable but not longitudinally displaceable in an end cap 54 on the bearing 49. Outside this cap, the screw spindle carries a sprocket 55 which is connected through a chain 56 to a sprocket 57 attached to the end of the shaft 58 of an electromotor 59. By means of this electromotor, the spindle 53 may be rotated for displacement of shaft 50 and rim 51 mounted thereon. It will be understood that the operating means for each rim are identical.

Rotation of the rims is obtained by means of a driving mechanism, see FIGS. 1 and 3, that comprises a driving roller 60 mounted rotatably on the one end of an arm 61, the other end of which arm is rotatably mounted in a bearing 62 attached to the one standard 40. An electromotor 63 is also mounted on the same standard as the driving roller 60 and by suitable means not visible in the drawing is connected to the shaft of this roller for its rotation. 64 indicates a casing enclosing these means. As best seen in FIG. 1, the arm 61 is rotatably connected to the end of a piston rod 65 in a hydraulic cylinder 66 that is rotatably attached to one of the standards 40. By means of this cylinder 66 the position of the driving roller 60 in relation to the rims 51 may be adjusted.

For controlling the position of a tire clamped between the two wheel rims 51, there is provided a caliper device comprising two caliper arms 70 that are linked to each other by connecting links 71 and pivotally attached to a carrier bar 72 fixed to the head bar 41.

Operation of the various motors in the machine is controlled from a panel attached in a convenient position on the housing 1, which also includes a control of air pressure through a nozzle 76 on the hollow shaft 50 for inflating a tire applied to the rims 51, and hydraulic force to the hydraulic cylinder 66. The above described machine operates in the following manner. By means of motors 59, the wheel rims are separated sufficiently for insertion therebetween of the tire to be buffed, whereupon they are again moved towards each other by means of the motors 59 clamping the tire between them. Air pressure is applied to the interior of the tire from nozzle 76 and is introduced through the hollow shaft 50. The driving roller 60 is adjusted by means of the hydraulic cylinder 66 so that it presses firmly against the tire tread. By means of motor 48, the framework 40, 41 is moved until the tire tread abuts the buffing member 2. Prior to this, the housing 1 is rotated by means of motor 34 until it takes up an intermediate position indicated in the diagrammatic FIG. 5 by the letter B. A template 28 corresponding to the profile and size of the tire to be buffed is attached to the pivot 9, and the guide tube 15 and follower 27 are adjusted in relation to the template 28 by operating hand wheel 23. The housing 1 is now rotated by hand to the position indicated by A in FIG. 5, which is starting position for the buffing operation. When in this position, the motors 5, 7, 34 and 63 are put into operation in a desired sequence. Motor 5 rotates the buffing member 2, motor 7 operates the suction blower 6, motor 34 rotates the housing from position A through position B to position C, as shown in FIG. 5, and motor 63 rotates the driving roller 60 that rotates the tire clamped between the rims 51.

Figure 5:
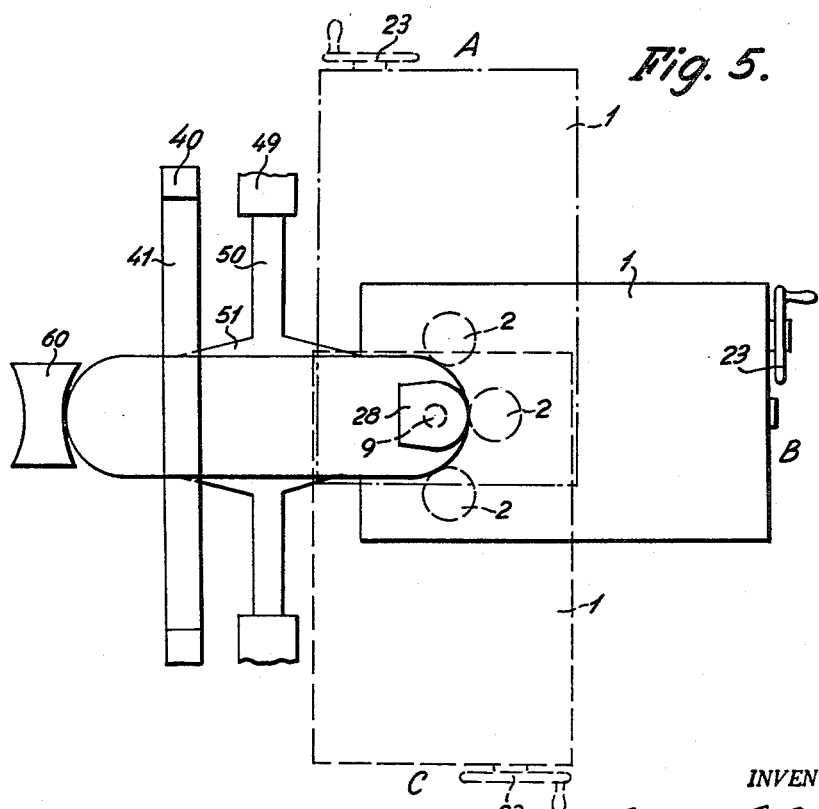
FIG. 5 shows diagrammatically the operation of the machine.

To render possible the adjustment of the housing by hand from position B to position A, FIG. 5, the motor 34 is tiltably arranged, as shown in FIG. 6. The motor 34 is mounted on a carrier 80 which is rotatable on a stationary bolt 81. By means of an arm 82, the carrier is connected to the end of a piston rod 83 of a hydraulic cylinder 84 that is controlled from the control panel (not shown). When the piston rod 83 is drawn into the cylinder 84 by suction, the arm 82 will tilt the carrier 80 and motor 34 from its operative position shown in full lines, in which the friction discs 32 have frictional connection with the flange 30 of the platform 12, to its inoperative position shown in dotted lines, in which position the friction discs 32 are disengaged from the flange 30. Consequently, the housing 1 may be freely rotated by hand. Upon again applying pressure to cylinder 84, the piston rod 82 will be displaced outwardly and thus tilt the motor 34 and move the friction discs 32 into frictional engagement with the flange 30 so that the housing can only be moved by means of motor 34.

When the machine is used for heavy work, i.e. buffing heavy tires, it may be provided with a device for lifting the tire as shown with dotted lines in FIG. 3. This device may comprise a hydraulic cylinder 85 attached to the one standard 40. The downwardly extending piston rod 86 of this cylinder 85 is attached to an arm 87 which in turn is attached to a bowl-shaped lifting member 88 disposed below the rims 51. The tire to be buffed is placed in the lifting member 88 when in its lowermost position, and upon applying suction to the cylinder the lifting member with tire therein is raised until the tire reaches a position between the spaced rims 51. After clamping the tire between the rims the lifting member is lowered to its initial position.

When heavy tires with prominent ribs, for instance tractor tires, are to be provided with a new tread, the wear on the spikes of the buffer member would be so considerable that the buffer member is rapidly worn out. To avoid this, the machine is provided with a cutter member 89, see FIG. 1, which is rotatably attached to the upper end of the housing 1 by means of a pivot 90. Rigidly attached to the cutter member there is a downwardly extending guard 91. When the buffer member 2 is in use, the cutter member 89 with guard 91 is turned upwardly on its pivot 90 and fixed in this position by any appropriate means. When the cutter is to be used, it is turned down to its position as shown in FIG. 1, in which position the guard 91 protects the buffer member 2. In this instance, the buffer member is not rotated.

I claim:
1. A tire buffing machine comprising, in combination:
 (a) a base;
 (b) an upright frame mounted for horizontal displacement on said base;
 (c) motor-driven means for horizontally displacing the upright frame on the base;
 (d) horizontal shaft means mounted on the upright frame for rotatably supporting a tire;
 (e) freely rotatable clamping means on the shaft means for detachably engaging the tire and thus to mount the tire on the shaft means;
 (f) another motor-driven means for engaging the tire and for rotating the engaged tire and the clamping means engaged with the tire;

(g) hydraulic means for moving the other motor-driven means into and out of engagement with the tire;

(h) a vertical pivot member rigidly mounted on the base, the upright frame being horizontally displaceable relative to the vertical pivot member;

(i) a horizontal platform rotatably mounted on the pivot member;

(j) a housing mounted on the platform for horizontal displacement thereon relative to the pivot member;

(k) further motor-driven means for rotating the platform and the housing on the pivot member;

(l) another hydraulic means for connecting and disconnecting the last-named motor-driven means from the platform and housing;

(m) a template detachably mounted on the pivot member;

(n) spring-biased follower means slidably mounted on the platform for coaction with the template; and (o) tire tread surfacing means mounted on the housing.

2. The tire buffing machine of claim 1, wherein said further motor-driven means comprises a substantially semi-circular flange projecting downwardly from the platform and centered about the pivot member, a motor friction engaging means coupling said flange with the motor, and means for pivoting the motor for engaging and disengaging the friction means and the flange.

3. The tire buffing machine of claim 1, wherein said spring-biased follower means includes an internally threaded tube longitudinally slidably mounted on said platform, a threaded spindle mounted in, and threadedly engaging, the internally threaded tube, the threaded spindle being rotatably mounted in said housing but held against longitudinal displacement therein, hand-operated means for longitudinally adjusting the tube in relation to the spindle, and a compression spring biasing the tube against the template.

4. The tire buffing machine of claim 1, wherein the first-named motor-driven means includes an internally threaded lug attached to said upright frame, an externally threaded spindle threadedly engaging the lug, the spindle being rotatably mounted on said base but held against longitudinal displacement, and a motor coupled to the spindle for rotating it and thus to displace the frame horizontally relative to the base.

5. A tire buffing machine comprising, in combination:

(a) a base;

(b) an upright frame mounted for horizontal displacement on said base;

(c) motor-driven means for horizontally displacing the upright frame on the base;

(d) two aligned shafts journalled in said upright frame and held against rotation, said aligned shafts being longitudinally displaceable relative to each other;

(e) freely rotatable wheel rims mounted on each of the shaft ends facing each other for detachable engagement of a tire upon relative displacement of the shafts toward each other;

(f) another motor-driven means for engaging the tire and for rotating the engaged tire and the wheel rims engaged with the tire, the latter means including driving roller mounted for engagement with the tire, an arm pivotally mounted on the upright frame and rotatably carrying the driving roller, and a motor mounted on the arm and coupled to the roller for rotation thereof;

(g) hydraulic means for pivoting the arm for engagement and disengagement of the driving roller with the tire;

(h) a vertical pivot member rigidly mounted on the base, the upright frame being horizontally displaceable relative to the vertical pivot member;

(i) a horizontal platform rotatably mounted on the pivot member;

(j) a housing mounted on the platform for horizontal displacement thereon relative to the pivot member;

(k) further motor-driven means for rotating the platform and the housing on the pivot member;

(l) another hydraulic means for connecting and disconnecting the last-named motor-driven means from the platform and housing;

(m) a template detachably mounted on the pivot member;

(n) spring-biased follower means slidably mounted on the platform for coaction with the template; and (o) tire tread surfacing means mounted on the housing.

6. The tire buffing machine of claim 5, wherein each of said aligned shafts is hollow and internally threaded and further comprising a threaded spindle mounted in, and threadedly engaging, each internally threaded shaft, the threaded spindles being rotatably mounted in said upright frame but held against longitudinal displacement thereon, and a motor coupled to the spindles for rotating the spindles and thus to displace the shafts longitudinally relative to each other.

7. The tire buffing machine of claim 5, further comprising an air supply nozzle on at least one of the hollow shafts and communicating with its hollow interior.

References Cited in the file of this patent

UNITED STATES PATENTS

| | | |
|---|---|---|
| 2,243,461 | Haskins | May 27, 1941 |
| 2,695,520 | Karsai | Nov. 30, 1954 |
| 2,794,503 | Kraft | June 4, 1957 |
| 2,888,065 | Neilsen | May 26, 1959 |
| 2,906,322 | Lewis | Sept. 29, 1959 |
| 2,925,125 | Curry | Feb. 16, 1960 |
| 2,965,162 | Hawkinson | Dec. 20, 1960 |